(12) United States Patent
Marra et al.

(10) Patent No.: US 9,195,764 B1
(45) Date of Patent: *Nov. 24, 2015

(54) PROVIDING AN ONLINE FORUM AS A SEARCH RESULT

(71) Applicant: Google Inc., Mountain View, CA (US)

(72) Inventors: Gregory Matthew Marra, San Francisco, CA (US); Sean Yaoxing Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,780

(22) Filed: Sep. 15, 2014

Related U.S. Application Data

(63) Continuation of application No. 13/615,159, filed on Sep. 13, 2012, now Pat. No. 8,862,598.

(60) Provisional application No. 61/681,529, filed on Aug. 9, 2012.

(51) Int. Cl.
*G06F 7/00* (2006.01)
*G06F 17/30* (2006.01)

(52) U.S. Cl.
CPC ................................ *G06F 17/30867* (2013.01)

(58) Field of Classification Search
CPC .......... G06F 17/3053; G06F 17/30575; G06F 17/30867; G06F 3/048; G06F 17/30699; G06F 11/321; G06F 11/325; G06F 17/30864; G06F 17/30991; G06F 19/327
See application file for complete search history.

(56) References Cited

U.S. PATENT DOCUMENTS

2011/0022602 A1*  1/2011  Luo et al. ...................... 707/748

* cited by examiner

*Primary Examiner* — Truong Vo
(74) *Attorney, Agent, or Firm* — McDermott Will & Emery LLP

(57) ABSTRACT

Systems and methods for providing an online forum as a search result are provided. In some aspects an indication of a search query from a first user is received. A search result for the search query is determined, where the search result is associated with an online forum. That one or more users of the online forum include one or more social contacts of the first user in a social networking service is determined. A ranking of the search result is changed based on the users of the online forum comprising the one or more social contacts. An indication of the search result is provided for display, where displayed information associated with the search result indicates at least one of the one or more social contacts.

22 Claims, 8 Drawing Sheets

PROVIDING AN ONLINE FORUM AS A SEARCH RESULT

CROSS-REFERENCE TO RELATED APPLICATIONS

The present application is a continuation application of U.S. patent application Ser. No. 13/615,159 entitled "PROVIDING AN ONLINE FORUM AS A SEARCH RESULT," filed on Sep. 13, 2012, which claims the benefit of priority under 35 U.S.C. §119 from U.S. Provisional Patent Application Ser. No. 61/681,529 entitled "PROVIDING AN ONLINE FORUM AS A SEARCH RESULT," filed on Aug. 9, 2012, the contents of which are hereby incorporated by reference in their entirety for all purposes.

BACKGROUND

The subject technology generally relates search interfaces and, in particular, relates to providing an online forum as a search result.

Online discussion forums, which allow users to post comments related to a topic, are provided within social networking services and externally to social networking services. Online forums related to specific topic(s) (e.g., "chess" or "cars") may be found via a search engine, by entering a search query that includes the topic(s) and text indicating that a forum is sought, for example, "forum" or "discussion." A search for a popular forum topic, for example, "chess discussion" may lead to multiple different online forums being presented in the search results.

SUMMARY

In some innovative aspects, the disclosed subject matter relates to a computer-implemented method. The method includes receiving an indication of a search query from a first user. The method includes determining a search result for the search query, where the search result is associated with an online forum. The method includes determining that one or more users of the online forum include one or more social contacts of the first user in a social networking service. The method includes changing a ranking of the search result based on the users of the online forum including the one or more social contacts. The method includes providing an indication of the search result for display, where displayed information associated with the search result indicates at least one of the one or more social contacts.

These and other embodiments can include one or more of the following features. The displayed information associated with the search result further includes an indication of a hierarchy of the online forum, the hierarchy of the online forum including a domain of the online forum and a title of the online forum. The hierarchy of the online forum further includes a sub-domain of the online forum or a category of the online forum. The hierarchy of the online forum is displayed in place of a web address of the online forum. The displayed information associated with the search result further includes a link to join the online forum. The search result is a member of a plurality of search results, where each search result in the plurality of search results is associated with a ranking. The method also includes determining a portion of the plurality of search results based on rankings associated with search results within the portion. The method also includes providing an indication of the portion of the plurality of search results for display. Providing the indication of the portion of the plurality of search results for display includes providing a visual notification of each and every search result within the portion of the plurality of search results for display, where the visual notifications of the each and every search result within the portion of the plurality of search results are arranged according to an order, and where a position in the order of a visual notification corresponding to the each search result in the portion of search results is determined based on the ranking of each search result. The online forum is an online forum within the social networking service. The online forum is not associated with the social networking service. The method also includes receiving, from a computing device associated with the at least one of the one or more social contacts, an indication that the at least one of the one or more social contacts is a member of the online forum, and storing the indication that the at least one of the one or more social contacts is the member of the online forum in a data repository of the social networking service.

In some innovative aspects, the disclosed subject matter relates to a computer-readable medium encoded with executable instructions. The instructions include code for determining a search result for a search query, where the search result corresponds to a webpage associated with an online forum, the online forum including users, and the online forum being related to the search query. The instructions include code for determining that one or more users of the online forum include one or more social contacts of a first user in a social networking service. The instructions include code for changing a ranking of the search result based on the one or more users of the online forum including the one or more social contacts. The instructions include code for providing an indication of the search results for display, where displayed information associated with the search result indicates at least one of the one or more social contacts.

These and other embodiments can include one or more of the following features. The instruction also include code for receiving the search query in conjunction with an identifier for an account of the first user in the social networking service. The displayed information associated with the specific search result also includes an indication of a hierarchy of the online forum, the hierarchy of the online forum including a provider of the online forum and a title of the online forum. The hierarchy of the online forum further includes a sub-domain of the online forum or a category of the online forum. The hierarchy of the online forum is displayed in place of a web address of the online forum. The displayed information associated with the specific search result further includes a link to join the online forum. The online forum includes an online forum within the social networking service. The online forum is not associated with the social networking service. The instructions also include code for receiving, from a computing device associated with the at least one of the one or more social contacts, an indication that the at least one of the one or more social contacts is a member of the online forum, and storing the indication that the at least one of the one or more social contacts is the member of the online forum in a data repository of the social networking service.

In some innovative aspects, the disclosed subject matter further relates to a system. The system includes one or more processors and a memory. The memory includes instructions. The instructions include code for receiving an indication of a search query from a first user. The instructions include code for determining a search result responsive to the search query, where the search result corresponds to a webpage associated with an online forum, the online forum including users, and the online forum being related to the search query. The instructions include code for determining that one or more users of the online forum include one or more social contacts of the first user in a social networking service. The instructions include code for changing a ranking of the search result based on the one or more users of the online forum including the one or more social contacts. The instructions include code for providing an indication of the search result for display, where displayed information associated with the search result indicates at least one of the one or more social contacts and a link to join the online forum.

These and other embodiments can include one or more of the following features. The search query is coupled with an identifier for an account of the first user in the social networking service. The system resides within a search server. The search server is communicatively coupled with a social networking service.

Advantageously, the subject technology provides search results that include online forum(s), along with indications of a user's social contacts who are members of the online forum(s). As a result, a user is better able to identify online forum(s) that are used by his/her social contacts and that may be of interest to the user. A user may be educated about the interests of his/her social contacts or the quality of the user's interaction with his/her social contacts may be improved.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
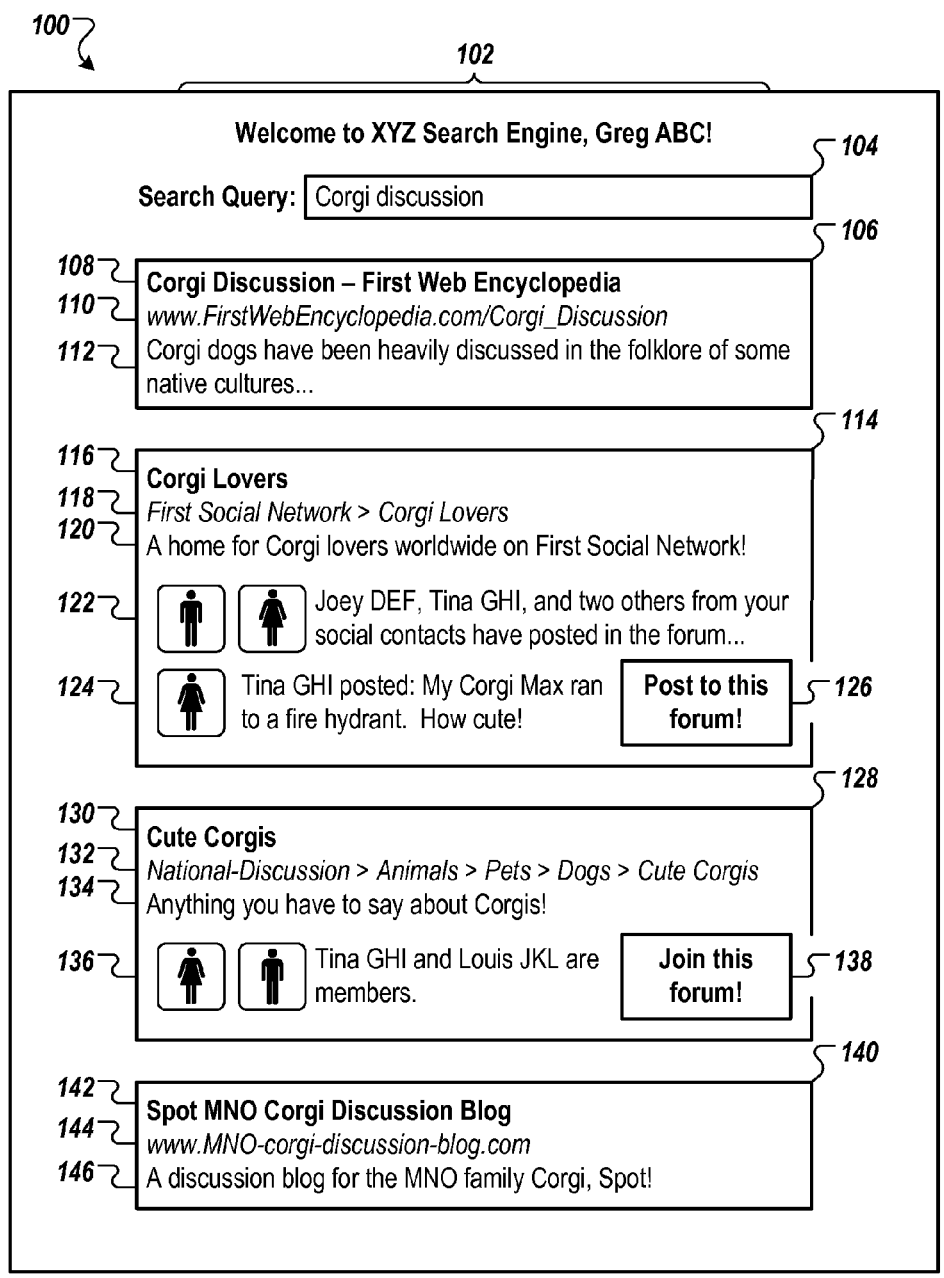
FIG. 1 illustrates an example page for providing an online forum as a search result.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, online discussion forums, which allow users to post comments related to a topic, are provided within social networking services and externally to social networking services. Online forums related to specific topic(s) (e.g., "chess" or "cars") may be found via a search engine, by entering a search query that includes the topic(s) and text or data indicating that a forum is sought, for example, "forum" or "discussion." A search for a popular forum topic, for example, "chess discussion" may lead to multiple different online forums being presented in the search results. As the foregoing illustrates, a new approach for providing search results that include online forum(s) may be desirable.

Users of social networking services may desire to share information and interact with their social contacts (e.g., friends) online. Thus, users may be interested in finding online forums in which their social contacts are members or to which their social contacts post data. The subject technology provides, among other things, techniques for notifying a user that his/her social contacts are active in (e.g., members of or posters of data in) online forums in the user's search results.

The subject technology includes techniques for providing search results that include online forums. In some aspects, a search server receives a search query from a user. The search server determines a set of search results responsive to the search query. Each search result in the set of search results is associated with a ranking. A specific search result in the set of search results corresponds to a webpage associated with an online forum. The online forum includes members and is related to the search query. The members may correspond to identifiers of users of computing devices who posted to the online forum or joined the online forum. The search server determines that the members of the online forum include one or more social contacts of the user in a social networking service. The social networking service may be coupled with the search server. The search server changes (e.g., increases or decreases) the ranking of the specific search result based on members of the online forum including the one or more social contacts. The search server determines a subset of the set of search results indicia of which are to be provided to the client computing device of the user based on rankings associated with search results within the subset. For example, the search server may select a threshold number (e.g., 10) of search results having the highest rankings. The server provides indicia of the subset of the set of search results for display via the client computing device of the user. The subset of search results includes the specific search result. The displayed information associated with the specific search result includes an indication of at least one of the one or more social contacts. The indication of the social contact(s) may be a name or an image associated with the social contact(s). In some aspects, the displayed information also includes a link to join (e.g., become a member of or post data to) the online forum.

FIG. 1 illustrates an example page 100 for providing an online forum as a search result. The page 100 may be displayed via an application executing on a client computing device. The application may be a web browser or another application (e.g., a mobile phone application or tablet computer application). As shown, the page 100 includes a title section 102, a search input box 104, and indications of search results 106, 114, 128, and 140.

As illustrated, the title section 102 includes an indication of the search engine—"XYZ Search Engine"—and an indication of the user—Greg ABC. The user Greg ABC may be logged into the search engine via the application. Alternatively, the search engine may be coupled with another application (e.g., one or more of an electronic messaging (e.g., email) application, a social networking service, an online calendar application, or an online document management application) that is coupled with the search engine. A user must affirmatively opt-in to using the search engine in conjunction with his/her login information or a user can opt-out of having the search engine know his/her login information. If a user does not provide his/her login information or logs out of the search engine, he/she may still conduct searches that reveal generic, but not personalized search results, as explained in greater detail below.

A user who does not log into the search engine or a related service or does not permit the search engine to user his/her personal information may receive generic search results, but not personalized search results to his/her search queries. A user who logs into the search engine and permits the search engine to user his/her personal information may receive generic search results and personalized search results. As used herein, a "generic search result" may be a result that does not include any personal information of the user and is not based on the personal information of the user. A "personalized search result" may be search result that includes personal information of the user or is based on personal information of the user. The user can affirmatively opt-in to or can opt-out of receiving personalized search results. Furthermore, the user may limit the information (e.g., the user's social contacts within a social networking service, the user's posts within the social networking service, posts that were shared with the user within the social networking service, etc.) that may be used in generating personalized search results.

The search input box 104 is configured to allow the user to enter a search query. As shown, the user has entered the search query "Corgi discussion" in the search input box 104. (A corgi is a breed of dog.) Search results 106, 114, 128, and 140 appear in response to the search query entered in the search input box 104. As illustrated, the search query in the search input box 104 is a text query. However, the subject technology may be implemented in conjunction with other types of queries, for example, image queries, audio queries, or video queries. In some aspects, a search query may include two or more of the above types of queries. For example, a search query entered in the search input box 104 may include both an image and text.

The search result 106 is an example of a generic search result. As shown, the search result 106 includes a title 108, a web address 110, and a brief description 112. The title 108 is the title of a webpage associated with the search result 106. The web address 110 is a uniform resource locator (URL) corresponding to the search result 106. The brief description 112 includes text from the webpage of the search result 106.

The search result 114 is an example of a personalized search result that corresponds to a webpage of an online forum within a social networking service coupled with the search engine. As shown, the search result 114 includes a title 116, a hierarchy 118, a brief description 120, an indication of membership 122, an indication of posts 124, and a post button 126. The title 116 is a title of the online forum associated with the search result 114. The hierarchy 118 illustrates a hierarchy for the search result 114—"First Social Network>Corgi Lovers"—the '>' sign indicates that "Corgi Lovers" is an online forum within "First Social Network," which may include multiple online forums. In some implementations, the hierarchy 118 may be displayed in place of a web address of the search result 114. Alternatively, the hierarchy 118 may be displayed in conjunction with the web address. First Social Network may be coupled with XYZ Search Engine, such that XYZ search engine can access posts and membership of online forums within First Social Network. However, a user of First Social Network affirmatively opts-in or does not opt-out of having his/her information shared with XYZ Search Engine.

The brief description 120 includes text from the webpage of the search result 114. The indication of membership 122 indicates that some of the user's (Greg ABC's) social contacts in First Social Network ("Joey DEF, Tina GHI, and two others") are members of the online forum corresponding to the search result 114. The indication of posts 124 indicates that one or more of the user's social contacts posted to the online forum corresponding to the search result 114. The indication of membership 122 or the indication of posts 124 may include indicia of the social contact(s), for example image(s) associated with the social contact(s) or names of the social contact(s). The post button 126, when selected, allows the user to post data (e.g., text, an image, or a video) to the online forum corresponding to the search result 114. The post button 126 may include a hyperlink for posting data to the online forum corresponding to the search result 114.

As used herein, "social circles" are categories to which users can assign their social networking contacts and better control the distribution and visibility of social networking messages. In accordance with the subject disclosure, a social circle is provided as a data set defining a collection of contacts that are associated with one another. A social circle can be described from the perspective of an individual that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. A user of an electronic device may define a social circle, and the social circle, as a data set defining a collection of contacts, may reflect a real-life social circle of the user. The social contacts of the user may correspond to members of one or more social circles of the user.

In one example, a user of an electronic device who has an account in a social networking service may have different groups of friends, coworkers and family, and there may be some overlap among those groups (e.g., a coworker who is also considered to be a friend, a family member who is also a coworker). Through the creation and use of social circles, the user can organize and categorize social networking contacts into various different groupings.

The search result 128 is an example of a personalized search result that corresponds to a webpage of an online forum that is not within the social networking service coupled with the search engine. As shown, the search result 128 includes a title 130, a hierarchy 132, a brief description 134, an indication of membership 136, and a join forum button 138. The title 130 is a title of the online forum associated with the search result 128. The hierarchy 132 illustrates a hierarchy for the search result 128—"National-Discussion>Animals>Pets>Dogs>Cute Corgis"—National-Discussion may be a host for multiple forums on multiple different topics within multiple different categories. One of the categories is "Animals," which has a sub-category "Pets," which has a sub-category "Dogs." "Cute Corgis" is a forum within the "Dogs" sub-category. One or more of the categories or sub-categories may correspond to a domain or a sub-domain within the forum. The categories and sub-categories are publically accessible to the XYZ search engine, allowing the XYZ search engine to provide the hierarchy 132 for display within the application. If the categories or sub-categories are non publically accessible, the hierarchy 132 is not displayed. In some implementations, the hierarchy 132 may be displayed in place of a web address of the search result 128. Alternatively, the hierarchy 132 may be displayed in conjunction with the web address.

The brief description 134 includes text from the webpage of the search result 128. The indication of membership 136 indicates that some of the user's (Greg ABC's) social contacts in First Social Network ("Tina GHI and Louis JKL") are members of the online forum corresponding to the search result 128. However, the online forum for the search result is not within the social networking service coupled with the search engine. Thus, the social contacts (Tina GHI and Louis JKL) have indicated, via their accounts in the social networking service (First Social Network) or via their accounts with the search engine (XYZ Search Engine), that they are members of the online forum corresponding to the search result 128 ("Cute Corgis"). The social networking service or the search engine may store the membership of online forums, as indicated to the social networking service or the search engine via its users, in a data repository. Any user regarding whom data is stored in the data repository affirmatively opts in to having his/her data stored or may opt-out of having his/her data stored in the data repository. The join forum button 138, when selected, allows the user to join the online forum corresponding to the search result 128. The join forum button 138 may include a hyperlink for joining the online forum corresponding to the search result 128. With appropriate permissions from the user, an indication that the user joined the online forum corresponding to the search result 128 may be stored in the data repository.

The search result 140 is an example of a generic search result that corresponds to a webpage. The webpage may correspond to an online forum or another type of webpage (e.g., an article or non-user-editable page). As shown, the search result 140 includes a title 142, a web address 144, and a brief description 146. The title 142 is the title of a webpage associated with the search result 140. The web address 144 is a uniform resource locator (URL) corresponding to the search result 140. The brief description 146 includes text from the webpage of the search result 106.

One example of a page 100 that displays search results 106, 114, 128, and 140 is described herein. However, search results may also be displayed in other ways in conjunction with implementations of the subject technology. Furthermore, an online forum is described above as a page for discussions about a topic (e.g., corgis). However, an online forum may correspond to any webpage that includes comments or posts by end-users or is modifiable by end-users. For example, an online forum may correspond to an online newspaper article that allows users to add comments, for example, below the newspaper article, for example, to express an opinion on the subject matter or content of the newspaper article. An online forum may also correspond to a social network group having a set of members (e.g., an alumni group or a group for a college sports team). Also, as shown, four search results 106, 114, 128, and 140 are displayed on the page 100. However, any number of search results may be displayed in conjunction with implementations of the subject technology.

Figure 2:
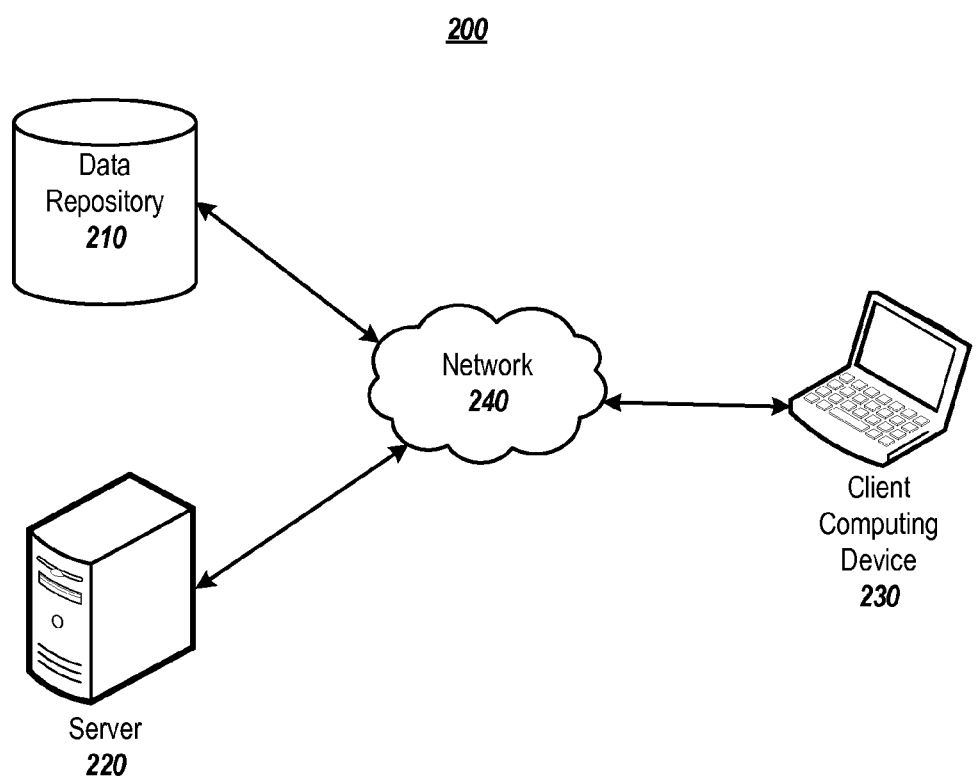
FIG. 2 illustrates an example of a system for providing an online forum as a search result.

FIG. 2 illustrates an example of a system 200 for providing an online forum as a search result.

As shown, the system 200 includes a data repository 210, a server 220, and a client computing device 230. The data repository 210, the server 220, and the client computing device 230 may be configured to communicate with one another via a network 240. The network 240 may include the Internet, an intranet, a local area network, a wide area network, a wired network, a wireless network, or a virtual private network (VPN). While only one data repository 210, server 220, and client computing device 230 are illustrated, the subject technology may be implemented in conjunction with any number of data repositories 210, servers 220, or client computing devices 230. In some aspects, a single machine may implement the functions of two or more of the data repository 210, the server 220, or the client computing device 230.

The data repository 210 may store indications of webpages, which may be generic web pages or forum webpages. Each webpage may be associated with one or more tags for retrieving the webpage in a search based on a search query. Each forum webpage may be associated with a set of members corresponding to users that post data in or interact with the forum. One example of the data repository 210 is described in more detail in conjunction with FIG. 3 below.

The server 220 may include one or more modules for searching data in the data repository 210 and providing output, based on search results, to the client computing device 230. The server 220 may be implemented as a single machine with a single processor, a multi-processor machine, or a server farm including multiple machines with multiple processors. One example of the server 220 is described in more detail in conjunction with FIG. 4 below.

The client computing device 230 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 230 may include one or more of a keyboard, a mouse, a display, or a touch screen. The client computing device 230 may also include a web browser configured to display webpages, for example a webpage that includes search results (e.g., page 100). Alternatively, pages including search results (e.g., page 100) may be presented on the client computing device 230 via a special purpose application.

Figure 3:
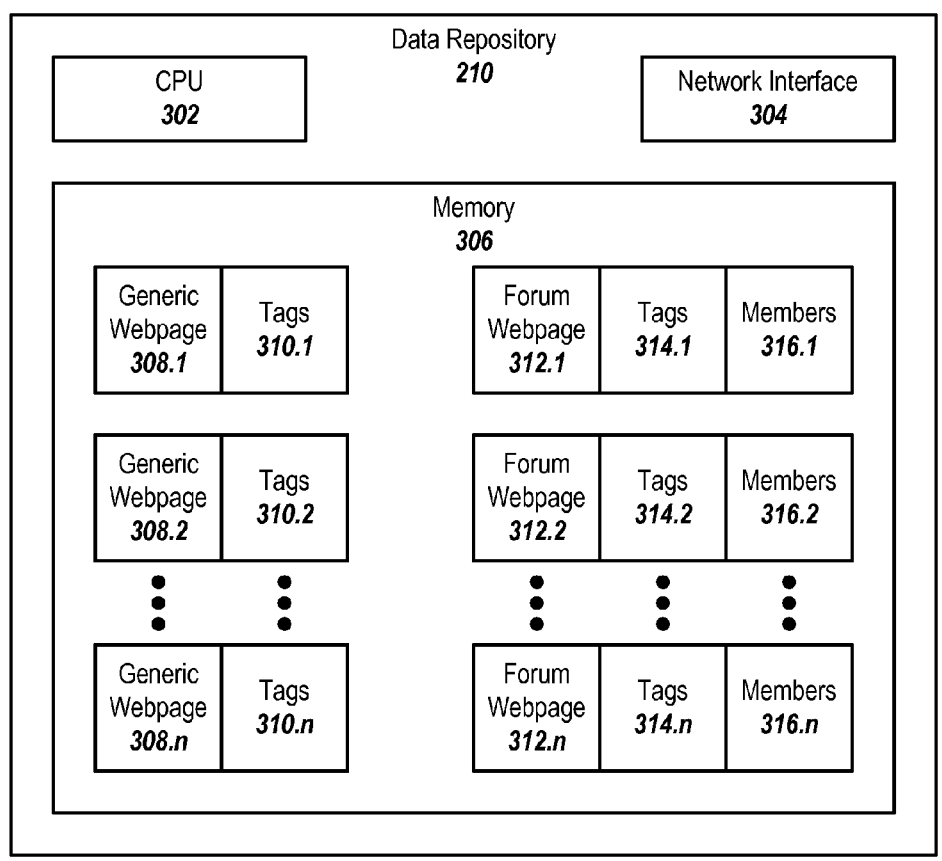
FIG. 3 illustrates an example of the data repository of FIG. 2.

FIG. 3 illustrates an example of the data repository 210 of FIG. 2. As shown, the data repository 210 includes a central processing unit (CPU) 302, a network interface 304, and a memory 306. The CPU 302 may include one or more processors. The CPU 302 is configured to execute computer instructions that are stored in a computer-readable medium, for example, the memory 306. The network interface 304 is configured to allow the data repository 210 to transmit and receive data in a network, e.g., network 240 of FIG. 2. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes multiple generic webpages 308.1-*n* and multiple forum webpages 312.1-*n*.

Each generic webpage 308.*k* is associated with tags 310.*k*. The tags 310.*k* may be words used in the generic webpage 308.*k*. The tags 310.*k* may correspond to tags for retrieving the webpage 308.*k* in a search based on a search query. For example, a webpage 308.*k* that includes an article about tennis player Roger UVW may be associated the tags 308.*k*: "tennis," "tennis player," "Roger UVW," and "UVW."

Each forum webpage 312.*k* is stored with an indication that the forum webpage 312.*k* is associated with an online forum. Similar to the generic webpages 308.1-*k*, each forum webpage 312.*k* is associated with tags 314.*k*. The tags 314.*k* may be used in the forum webpage 312.*k*. The tags 314.*k* may correspond to tags for retrieving the forum webpage 312.*k* in a search based on a search query. For example, a forum webpage 312.*k* for discussing gluten-free dieting may be associated with the tags 314.*k*: "gluten-free diet," "gluten-free," "gluten," and "diet." Each forum webpage 312.*k* may also be associated with a set of member 316.*k*.

In some aspects, the forum webpage 312.*k* is within a social networking service associated with a search engine executing via the server 220. The set of members 316.*k* may include members of the social networking service who are members of the forum webpage 312.*k* or who posted in the forum webpage 312.*k*, as stored in association with the social networking service. However, each member of the social networking service affirmatively opts-in to or can opt-out of having all or a portion of his/her activity in the social networking service be searchable via the search engine. Also, a member of the social networking service may limit sharing or searching of his/her activity to his/her own social contacts or members of his/her own social circles.

In some aspects, the forum webpage 312.*k* is not within the social networking service associated with the search engine executing via the server 220. However, the members of the social networking service may have affirmatively opted-in to sharing that they are members of the forum webpage 312.*k* via the social networking service. As a result, the data repository 210 may store these indications via the set of members 316.*k* of the forum webpage 312.*k*. However, a user of the social networking service may limit with whom his/her membership in online forum webpages 312.1-*n* is shared, e.g., to his/her own social contacts or members of his/her own social circles.

Figure 4:
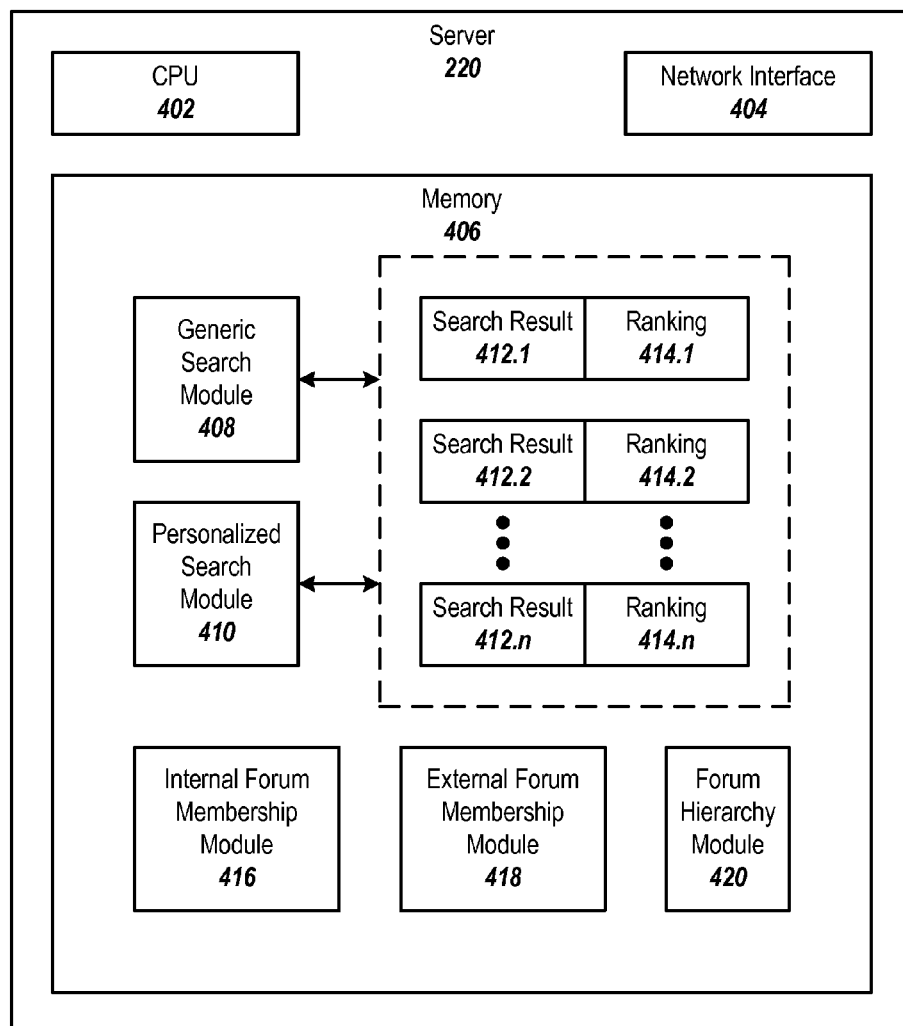
FIG. 4 illustrates an example of the server of FIG. 2.

FIG. 4 illustrates an example of the server 220 of FIG. 2. As shown, the server 220 includes a central processing unit (CPU) 402, a network interface 404, and a memory 406. The CPU 402 may include one or more processors. The CPU 402 is configured to execute computer instructions that are stored in a computer-readable medium, for example, the memory 406. The network interface 404 is configured to allow the server to transmit and receive data in a network, e.g., network 240 of FIG. 2. The network interface 404 may include one or more network interface cards (NICs). The memory 406 stores data or instructions. The memory 406 may be one or more of a cache unit, a storage unit, an internal memory unit, or an external memory unit. As illustrated, the memory 406 includes a generic search module 408, a personalized search module 410, search results 412.1-*n*, an internal forum membership entry module 416, an external forum membership entry module 418, and a forum hierarchy module 420.

The generic search module 408 is configured to conduct searches to generate generic search results. Specifically, the generic search module 408 is configured to receive a search query (e.g., via a client computing device). The generic search module 408 is configured to determine a set of search results 412.1-*n* responsive to the search query. Each search result 412.*k* is associated with a ranking 414.*k*. The ranking 414.*k* indicates how closely the search result 412.*k* matches or is related to the search query. The generic search module 408 is configured to determine a subset of the set of search results based on the rankings associated with search results within the subset (e.g., the threshold number (e.g., ten) of search results having the highest rankings). The generic search module 408 is configured to provide indicia of the subset of the set of search results for display (e.g., via the client computing device). For example, the titles of search results in the subset may be listed on a page.

The personalized search module 410 is configured to conduct searches to generate personalized search results or generic search results. Specifically, the personalized search module 410 is configured to receive a search query from a user (e.g., via a client computing device). The search query may be coupled with an identifier for an account of the user in a social networking service. The personalized search module 410 is configured to determine a set of search results 412.1-*n* responsive to the search query. Each search result 412.*k* is associated with a ranking 414.*k*. The ranking 414.*k* indicates how closely the search result 412.*k* matches or is related to the search query. A specific search result 412.1 in the set of search results 412.1-*n* corresponds to a webpage associated with an online forum. The online forum includes members and the online forum is related to the search query. The personalized search module 410 is configured to determine that the members of the online forum include one or more social contacts of the user in the social networking service. The personalized search module 410 is configured to change (e.g., increase) the ranking 414.1 of the specific search result 412.1 based on the members of the online forum including the one or more social contacts due to the increased likelihood of the user being interested in the online forum. The personalized search module 410 is configured to determine a subset of the set of search results based on the rankings associated with search results within the subset (e.g., the threshold number (e.g., ten) of search results having the highest rankings). The subset includes the specific search result 412.1. The personalized search module 410 is configured to provide indicia of the subset of the set of search results for display (e.g., via the client computing device). For example, the titles of search results in the subset may be listed on a page. Displayed information associated with the specific search result includes an indication (e.g., a name or an image) of at least one of the one or more social contacts. The displayed information associated with the specific search result may also include a hierarchy of the online forum (e.g., hierarchy 118 or hierarchy 132). The hierarchy includes a domain of the online forum and a title of the online forum.

In some aspects, the personalized search module 410 is communicatively coupled with the social networking service. With appropriate permissions from user(s) of the social networking service, the personalized search module 410 may be able to access information (e.g., posts, biographic data, membership in online forum(s), etc.) associated with user(s) stored within the social networking service.

The internal forum membership module 416 is configured to determine the members of forums within a social networking service communicatively coupled with the server. With appropriate permissions from user(s) of the social networking service, the internal forum membership module 416 may have access to post by users in the social networking service and activity within forums of the social networking service and may determine membership in forums of the social networking service based on the posts and the activity within the forums.

The external forum membership module 418 is configured to determine the members of forums not within the social networking service communicatively coupled with the server. In some examples, the external forum membership module 418 receives, from a computing device (e.g., client computing device 230) associated with a member of the social networking service, an indication that the member of the social networking service is a member of an online forum external to the social networking service. For example, the social networking service may allow a member to list online forums of which he/she is a member in conjunction with his/her biographic information. The external forum membership module may store the indication that the member of the social networking service is a member of the online forum within the social networking service. With appropriate permissions from the member, the fact that the member of the social networking service is a member of the online forum may be shared with the personalized search module 410 for responding to search queries by users who are social contacts of the member.

The forum hierarchy module 420 is configured to determine a hierarchy of an online forum for displaying via a page (e.g., via the client computing device 230). The hierarchy may include a domain of the online forum (e.g., a domain that hosts multiple online forums) and a title of the online forum. If online forums on the domain are divided into categories or sub-categories, the hierarchy may include the categories or sub-categories corresponding to the online forum. The hierarchy may be provided to the server 220 by the domain, or the hierarchy may be determined by the server 220 using a web crawler with appropriate permissions from the domain, i.e., if the domain makes the structure of online forums on the domain public.

Figure 5A:
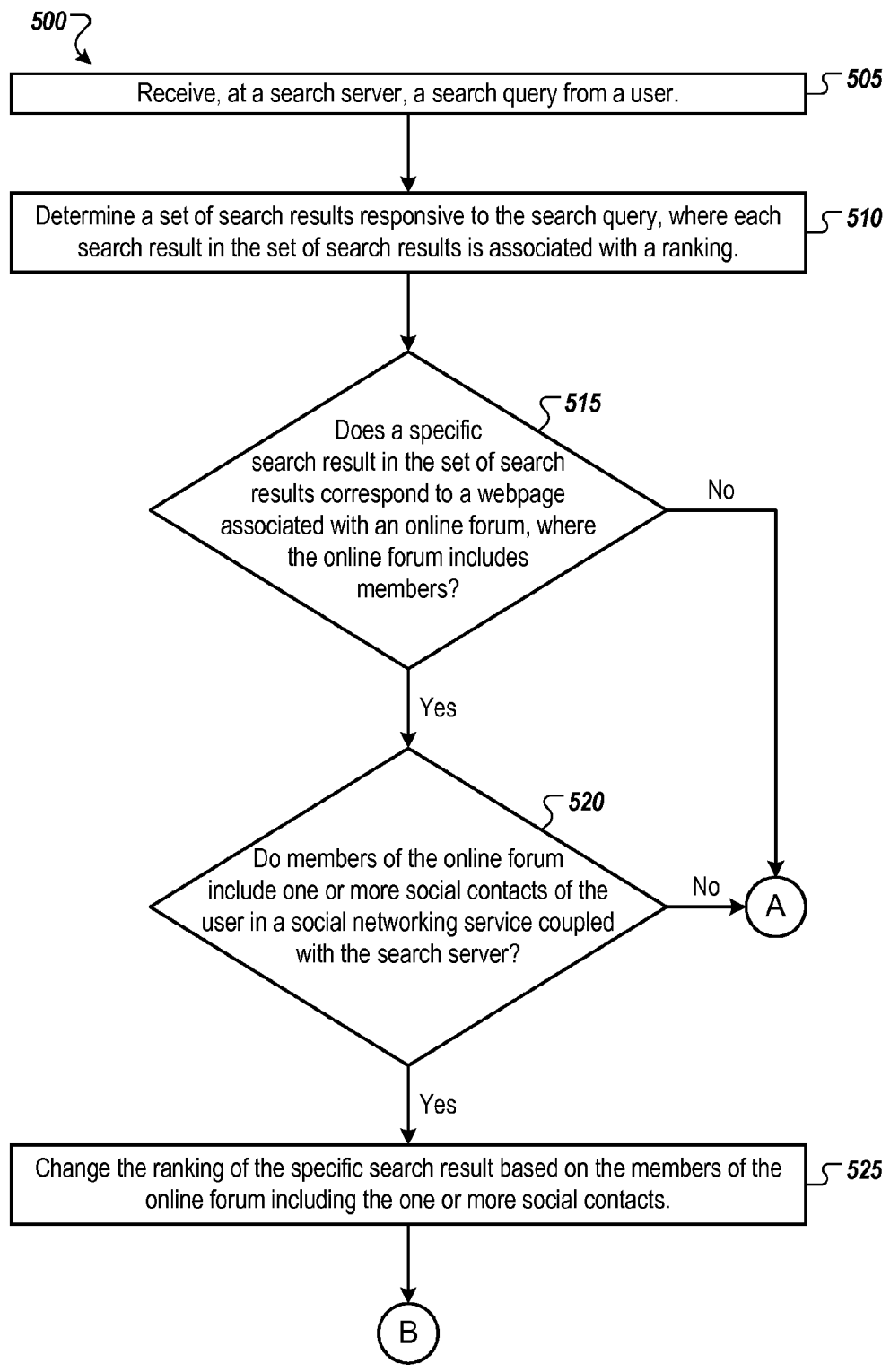
FIGS. 5A-5C illustrates an example process by which search results may be provided.
Figure 5B:
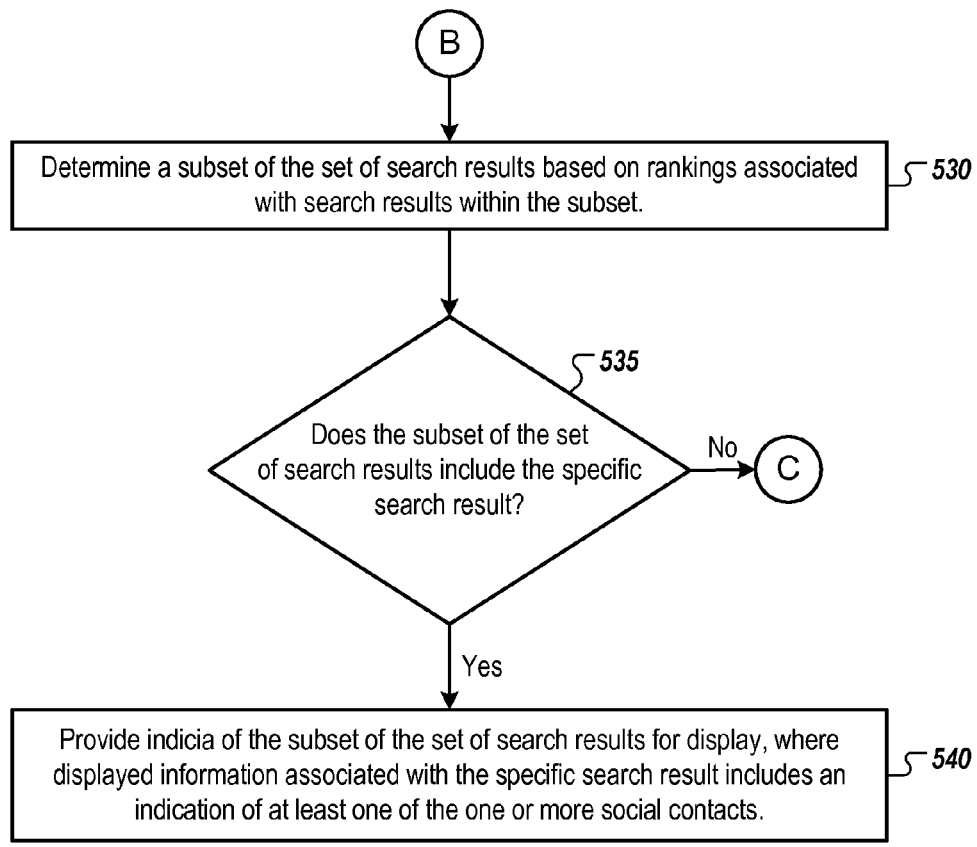
Figure 5C:
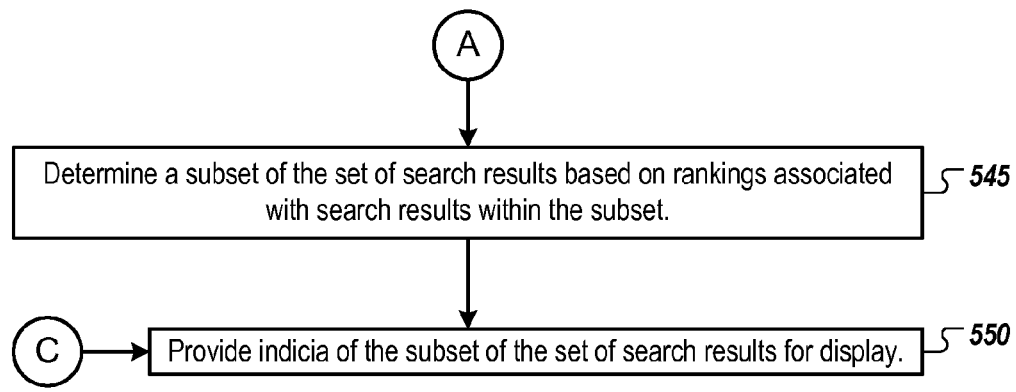

FIGS. 5A-5C illustrates an example process 500 by which search results may be provided.

As shown in FIG. 5A, the process 500 begins at step 505, where a search server (e.g., server 220) receives a search query from a user. The search query may be associated with a user's account in a social networking service. For example, the user may be logged into the social networking service while submitting the search query from his/her client computing device and have enabled personalized search results. The search query may be received at the search server in conjunction with an identifier for an account of the user in the social networking service.

In step 510, the search server determines a set of search results responsive to the search query. Each search result in the set of search results is associated with a ranking.

In step 515, the search server determines whether a specific search result in the set of search results corresponds to a webpage associated with an online forum, where the online forum includes members. The webpage associated with the online forum includes comments or posts by the members or is modifiable by the members. If the specific search result in the set of search results corresponds to a webpage associated with an online forum, the process 500 continues to step 520. Otherwise, the process 500 continues to step 545.

In step 520, the search server determines whether members of the online forum include one or more social contacts of the user in a social networking service coupled with the search server. The one or more social contacts of the user may corresponds to entities in the user's social circles.

The online forum may be an online forum within the social networking service (e.g., a "Corgi Lovers" forum within the social networking service). Alternatively, the online forum may be an online forum external to the social networking service (e.g., having a page that is not within a domain of the social networking service). If the online forum is external to the social networking service, the social networking service may, for example, at a time before implementation of the process 500, receive, from a computing device associated with a social contact of the user, an indication that the social contact is a member of the online forum (e.g., the social contact may indicate online forums of which he/she is a member in his/her biographic information provided to the social networking service). The social networking service may store this indication in a data repository of the social networking service and, with appropriate permissions from the social contact, provide this indication to the search server during implementation of the process 500.

If the members of the online forum include the one or more social contacts of the user, the process 500 continues to step 525. Otherwise, the process 500 continues to step 545.

In step 525, the search server changes (e.g., increases) the ranking of the specific search result based on the members of the online forum including the one or more social contacts, as the user may be more interested in the online forum because his/her social contacts are members of the online forum.

As shown in FIG. 5B, in step 530, the search server determines a subset of the set of search results based on ranking associated with search results within the subset. For example, the subset may include a threshold number (e.g., 10) of the highest ranked search results or all search results whose ranking exceeds a threshold ranking.

In step 535, the search server determines whether the subset of the set of search results includes the specific search result (corresponding to a webpage associated with an online forum). If the subset includes the specific search result, the process 500 continues to step 540. Otherwise, the process 500 continues to step 550.

In step 540, the search server provides indicia of the subset of the set of search results (e.g., one or more of a title, a web address, or a brief description) for display (e.g., via a page presented on a client computing device of the user). Displayed information associated with the specific search result includes an indication (e.g., an image or a name) of at least one of the one or more social contacts. As a result, the user may know that his/her social contacts are members of the online forum associated with the specific search result and may become more interested in the online forum.

In some aspects, the displayed information associated with the specific search result also includes a hierarchy of the online forum (e.g., hierarchy 118 or hierarchy 132). The hierarchy of the online forum includes a name of the online forum and a title of the online forum. If a sub-domain, a category, or a sub-category of the online forum are accessible to the search server (e.g., via operation of a web crawler accessing public information), the hierarchy may also include the sub-domain, the category, or the sub-category of the online forum. In some aspects, the displayed information associated with the specific search result includes a link to join (e.g., become a member of or post data to) the online forum. In some aspects, the displayed information associated with the specific search result may also include a number of posts, a date or amount of time passed since a last post, or a total number of members. In some aspects, the search server providing a visual notification of each and every search result within the subset of the set of search results for display. The visual notifications of the search results are arranged according to an order. A position in the order of a visual notification corresponding to the specific search result is determined based on the changed ranking (in step 525) of the specific search result. After step 540, the process 500 ends.

As shown in FIG. 5C, in step 545, if the set of search results does not include the specific search result corresponding to the webpage associated with the online forum, or the members of the online forum do not include social contact(s) of the user, the search server determines a subset of the set of search results based on rankings associated with search results within the subset. For example, the subset may include a threshold number (e.g., 10) of the highest ranked search results or all search results whose ranking exceeds a threshold ranking.

In step 550, the search server provides indicia of the subset of the set of search results (e.g., one or more of a title, a web address, or a brief description) for display (e.g., via a page presented on a client computing device of the user). After step 550, the process 500 ends.

As used herein, set A, which includes elements, is a subset of set B, which include elements, if all of the elements of set A are also elements of set B and set A does not include any elements that are not elements of set B. Set A may be equivalent to set B, or set A may include a portion of the elements of set B.

Figure 6:
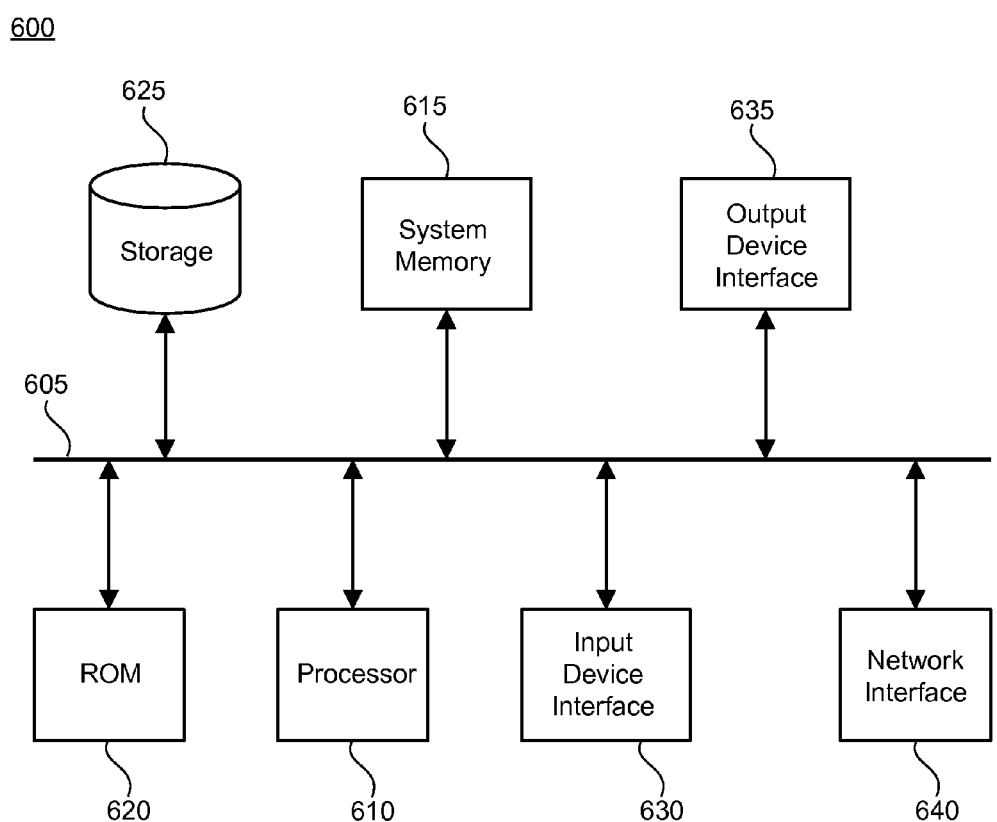
FIG. 6 conceptually illustrates an example electronic system with which some implementations of the subject technology are implemented.

FIG. 6 conceptually illustrates an electronic system 600 with which some implementations of the subject technology are implemented. For example, one or more of the data repository 210, the server 220, or the client computing device 230 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing an online forum as a search result in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
   receiving an indication of a search query from a first user;
   determining a search result for the search query, wherein the search result is associated with an online group;
   determining that one or more users of the online group comprise one or more social contacts of the first user in a social networking service, wherein determining that the one or more users of the online group comprise the one or more social contacts of the first user comprises:

receiving an indication that the at least one of the one or more social contacts is a member of the online group, and storing the indication that the at least one of the one or more social contacts is the member of the online group in a data repository of the social networking service;

changing a ranking of the search result based on the users of the online group comprising the one or more social contacts;

providing information associated with the search result for display, wherein the information associated with the search result indicates at least one of the one or more social contacts and comprises an interface for participating in the online group.

2. The method of claim 1, wherein the displayed information associated with the search result further comprises an indication of a hierarchy of the online group, the hierarchy of the online group comprising a domain of the online group and a title of the online group.

3. The method of claim 2, wherein the hierarchy of the online group further comprises a sub-domain of the online group or a category of the online group.

4. The method of claim 2, wherein the hierarchy of the online group is displayed in place of a web address of the online group.

5. The method of claim 1, wherein the interface for participating in the online group comprises a link to join the online group.

6. The method of claim 1, wherein the search result is a member of a plurality of search results, wherein each search result in the plurality of search results is associated with a ranking.

7. The method of claim 6, further comprising:
determining a portion of the plurality of search results based on rankings associated with search results within the portion; and
providing an indication of the portion of the plurality of search results for display.

8. The method of claim 7, wherein providing the indication of the portion of the plurality of search results for display comprises:
providing a visual notification of each and every search result within the portion of the plurality of search results for display, wherein the visual notifications of the each and every search result within the portion of the plurality of search results are arranged according to an order, and wherein a position in the order of a visual notification corresponding to the each search result in the portion of search results is determined based on the ranking of each search result.

9. The method of claim 1, wherein the online group comprises an online group within the social networking service.

10. The method of claim 1, wherein the online group is not associated with the social networking service.

11. The method of claim 1, wherein the interface for participating in the online group comprises a link to post text, image or video data to the online group.

12. A non-transitory computer-readable medium comprising instructions which, when implemented by one or more computers, cause the one or more computers to perform a method, the method comprising:
determining a search result for a search query, wherein the search result corresponds to a webpage associated with an online group, the online group comprising users, and the online group being related to the search query;
determining that one or more users of the online group comprise one or more social contacts of a first user in a social networking service, wherein determining that the one or more users of the online group comprises the one or more social contacts of the first user comprises:
receiving an indication that the at least one of the one or more social contacts is a member of the online group, and
storing the indication that the at least one of the one or more social contacts is the member of the online group in a data repository of the social networking service;
changing a ranking of the search result based on the one or more users of the online group comprising the one or more social contacts;
providing information associated with the search result for display, wherein the information associated with the search result indicates at least one of the one or more social contacts and comprises an interface for participating in the online group.

13. The computer-readable medium of claim 12, wherein the method further comprises:
receiving the search query in conjunction with an identifier for an account of the first user in the social networking service.

14. The computer-readable medium of claim 12, wherein the displayed information associated with the specific search result further comprises an indication of a hierarchy of the online group, the hierarchy of the online group comprising a provider of the online group and a title of the online group.

15. The computer-readable medium of claim 14, wherein the hierarchy of the online group further comprises a sub-domain of the online group or a category of the online group.

16. The computer-readable medium of claim 14, wherein the hierarchy of the online group is displayed in place of a web address of the online group.

17. The computer-readable medium of claim 12, wherein the interface for participating in the online group comprises a link to join the online group.

18. The computer-readable medium of claim 12, wherein the online group comprises an online group within the social networking service.

19. The computer-readable medium of claim 12, wherein the online group is not associated with the social networking service.

20. A system comprising:
one or more processors; and
a memory comprising instructions which, when executed by the one or more processors, cause the one or more processors to implement a method, the method comprising:
receiving an indication of a search query from a first user;
determining a search result responsive to the search query, wherein the search result corresponds to a webpage associated with an online group, the online group comprising users, and the online group being related to the search query;
determining that one or more users of the online group comprise one or more social contacts of the first user in a social networking service;
changing a ranking of the search result based on the one or more users of the online group comprising the one or more social contacts, wherein determining that the one or more users of the online group comprises the one or more social contacts of the first user comprises:

receiving an indication that the at least one of the one or more social contacts is a member of the online group, and storing the indication that the at least one of the one or more social contacts is the member of the online group in a data repository of the social networking service;

providing information associated with the search result for display, wherein the information associated with the search result indicates at least one of the one or more social contacts and a link to join the online group and comprises an interface for participating in the online group.

21. The system of claim 20, wherein the search query is coupled with an identifier for an account of the first user in the social networking service.

22. The system of claim 20, wherein the system resides within a search server, wherein the search server is communicatively coupled with a social networking service.

* * * * *